US009693013B2

(12) United States Patent
Nesamoney et al.

(10) Patent No.: US 9,693,013 B2
(45) Date of Patent: Jun. 27, 2017

(54) METHOD AND APPARATUS TO DELIVER VIDEO ADVERTISEMENTS WITH ENHANCED USER INTERACTIVITY

(75) Inventors: Diaz Nesamoney, Atherton, CA (US); Parth S. Chandra, Palo Alto, CA (US)

(73) Assignee: Jivox Corporation, Santa Clara, CA (US)

( * ) Notice: Subject to any disclaimer, the term of this patent is extended or adjusted under 35 U.S.C. 154(b) by 892 days.

(21) Appl. No.: 12/939,064

(22) Filed: Nov. 3, 2010

(65) Prior Publication Data

US 2011/0219403 A1 Sep. 8, 2011

Related U.S. Application Data

(60) Provisional application No. 61/311,685, filed on Mar. 8, 2010.

(51) Int. Cl.
*H04N 7/025* (2006.01)
(52) U.S. Cl.
CPC .................................. *H04N 7/025* (2013.01)
(58) Field of Classification Search
USPC ........................................................ 705/14
See application file for complete search history.

(56) References Cited

U.S. PATENT DOCUMENTS

| 8,244,830 | B2 * | 8/2012 | Robinson et al. ............ 709/217 |
| 2008/0077956 | A1 * | 3/2008 | Morrison et al. ............... 725/38 |
| 2008/0140523 | A1 * | 6/2008 | Mahoney ........... G06Q 30/0256 705/14.54 |
| 2008/0320391 | A1 * | 12/2008 | Lemay et al. ................. 715/702 |
| 2009/0024927 | A1 * | 1/2009 | Schrock et al. .............. 715/722 |
| 2009/0030785 | A1 * | 1/2009 | Goyal et al. .................... 705/14 |
| 2009/0048921 | A1 * | 2/2009 | Tokuda et al. .................. 705/14 |
| 2009/0132341 | A1 * | 5/2009 | Klinger et al. ................. 705/10 |
| 2010/0023398 | A1 * | 1/2010 | Brown et al. ............. 705/14.49 |
| 2010/0030578 | A1 * | 2/2010 | Siddique et al. ................. 705/3 |
| 2010/0138852 | A1 * | 6/2010 | Hirsch et al. ................... 725/13 |
| 2010/0218211 | A1 * | 8/2010 | Herigstad et al. .............. 725/34 |
| 2010/0325646 | A1 * | 12/2010 | Alhadeff et al. ............... 725/10 |
| 2011/0112915 | A1 * | 5/2011 | Geer et al. ................. 705/14.73 |
| 2011/0161492 | A1 * | 6/2011 | Granville ...................... 709/224 |
| 2012/0124486 | A1 * | 5/2012 | Robinson et al. ............ 715/753 |

\* cited by examiner

*Primary Examiner* — Fonya Long
*Assistant Examiner* — Rodney Henry
(74) *Attorney, Agent, or Firm* — Michael A. Glenn; Perkins Coie LLP

(57) ABSTRACT

An advertising system delivers video ads into hypertext documents, where these ads provide enhanced user interactivity features selected and configured by advertisers or other ad sponsors. The system also provides sophisticated tracking and real time reporting of viewer interactivity with the video ads and their enhanced features.

17 Claims, 20 Drawing Sheets

```
<?xml version='1.0' encoding='UTF-8' ?>
<jivoxServerResponse>
<status>ok</status>
<numAds>1</numAds>
<ads>
<ad>
<id>12643</id>
<adId>21885</adId>
<adURL>http://cdn.jivox.com/WP1_12759_12643_21885.mp4</adURL>
<duration>13.0</duration>
<thumbnailURL>http://slate.jivox.com/jivox/ads/videos/21885-12759-atn-4ca3aec84aa74-tn.jpg</thumbnailURL>
<interactiveOptions>
<clickThroughURL>http://www.jivox.com</clickThroughURL>
</interactiveOptions>
<interactivityEnabled>1</interactivityEnabled>
</ad>
</ads>
</jivoxServerResponse>
```

FIG. 18

```
<?xml version='1.0' encoding='UTF-8'?>
<jivoxServerResponse>
<status>ok</status>
<interactiveOptions>
    <clickThroughURL>
        <data>http://www.jivox.com</data>
        <label>Visit Advertiser website</label>
        <icon>http://slate.jivox.com/advertiser/images/interactivity-icon-10.png</icon>
        <order>1</order>
    </clickThroughURL>
    <shareViaEmail>
        <enabled>1</enabled>
        <label>Share this via an mail</label>
        <icon>http://slate.jivox.com/advertiser/images/interactivity-icon-5.png</icon>
        <externalPostURL>http://evs.jivox.com/jivox/serverAPIs/sendMail.php::jivox_xml</externalPostURL>
        <order>2</order>
    </shareViaEmail>
</interactiveOptions>
<cost>
<cpm>10</cpm><cpc>0</cpc>
</cost>
</jivoxServerResponse>
```

```xml
<?xml version='1.0' encoding='UTF-8' ?>
<jivoxServerResponse><status>ok</status>
<interactiveOptions>
    <interactivityTitle>Rollover for More</interactivityTitle>
    <interactBar></interactBar>
    <customInteraction>
        <enabled>1</enabled>
        <count>1</count>
        <type></type>
        <nameLabel>customInteraction.buy-mojo</nameLabel>
        <label>Buy Mojo</label>
        <icon>http://slate.jivox.com/jivox/ads/wa/9254-0-pro-4c0ee5276f4d4.png</icon>
        <data>http://www.amazon.com/Mojo-Tom-Petty-Heartbreakers/dp/B003A4IFGY/</data>
        <eventType>102</eventType>
    </customInteraction>
    <customInteraction>
        <enabled>1</enabled>
        <count>2</count>
        <type></type>
        <nameLabel>customInteraction.mojo-tour</nameLabel>
        <label>Mojo Tour</label>
        <icon>http://slate.jivox.com/jivox/ads/wa/9254-0-pro-4c0ee6594659c.png</icon>
        <data>http://www.tompetty.com/</data>
        <eventType>101</eventType>
    </customInteraction>
    <customInteraction>
        <enabled>1</enabled>
        <count>3</count>
        <type></type>
        <nameLabel>customInteraction.music-video</nameLabel>
        <label>Music Video</label>
        <icon>http://slate.jivox.com/jivox/ads/wa/9254-0-pro-4c0ee5f245c8e.png</icon>
        <data>http://slate.jivox.com/jivox/ads/wa/9254-pro-4c0944c4b241c.swf</data>
        <eventType>104</eventType>
```

```
</customInteraction>
<customInteraction>
  <enabled>1</enabled>
  <count>4</count>
  <type></type>
  <nameLabel>customInteraction.see-more-video</nameLabel>
  <label>See More ideo</label>
  <icon>http://slate.jivox.com/jivox/ads/wa/10428-0-pro-4c12c9c5221c3.png</icon>
  <data>http://slate.jivox.com/jivox/ads/wa/10428-pro-4c12c93e47e3a.swf</data>
  <eventType>107</eventType>
</customInteraction>
<customInteraction>
  <enabled>1</enabled>
  <count>5</count>
  <type></type>
  <nameLabel>customInteraction.tom-petty-on-facebook</nameLabel>
  <label>Tom Petty on Facebook</label>
  <icon>http://slate.jivox.com/jivox/ads/wa/9254-0-pro-4c0ee62ee3359.png</icon>
  <data>http://www.facebook.com/tompetty</data>
  <eventType>105</eventType>
</customInteraction>
<customInteraction>
  <enabled>1</enabled>
  <count>6</count>
  <type></type>
  <nameLabel>customInteraction.tom-petty-on-twitter</nameLabel>
  <label>Tom Petty on Twitter</label>
  <icon>http://slate.jivox.com/jivox/ads/wa/9254-0-pro-4c0ee63d8084b.png</icon>
  <data>http://twitter.com/tompettydotcom</data>
  <eventType>106</eventType>
</customInteraction>
</interactiveOptions>
</jivoxServerResponse>
```

METHOD AND APPARATUS TO DELIVER VIDEO ADVERTISEMENTS WITH ENHANCED USER INTERACTIVITY

CROSS-REFERENCE TO RELATED APPLICATIONS

This application claims the benefit of the following earlier-filed U.S. Provisional Application in accordance 35 USC 119: U.S. Application No. 61/311,685 entitled METHOD TO MEASURE & ENHANCE USER ENGAGEMENT, filed on Mar. 8, 2010 in the names of Nesamoney and Chandra. The entirety of the foregoing application is hereby incorporated herein by reference.

BACKGROUND OF THE INVENTION

1. Field of the Invention

The invention relates to advertising materials delivered in hypermedia documents. More particularly, the invention concerns a method and apparatus for delivering video ads with enhanced user interactivity features.

2. Description of the Related Art

The field of advertising is changing drastically as a result of advancements in technology, such as the popularity of mobile devices, and the decline of print media. Electronic ads now appear in websites, video clips, emails, and many other locations, media, and formats.

One perpetual challenge is how to better engage the viewer in an advertising campaign. Electronic ads such as web page banner ads and videos compete for the viewer's attention, but it can be difficult to attract the viewer's attention to a particular ad. It is even more difficult to develop sufficient interest that the viewer "clicks" on a banner ad, or permits an automatically activated video to run without the viewer closing it.

A separate challenge that confronts advertisers is, once a given strategy is implemented to engage viewers, how to determine the success of an advertising campaign. Some delivery mechanisms for video advertising collect statistics and report them back to advertisers. In some cases, these statistics include the number of different viewers that started to view a particular video ad, and how long the ad ran in viewers' browsers before being closed. However, these statistics are not a comprehensive as some might like, to more accurately assess the success of an advertising campaign.

Hence, it can be particularly difficult to gauge the success of techniques implemented to better engage viewers if the mechanisms for measuring success of an advertising campaign are limited.

SUMMARY OF THE INVENTION

An advertising system delivers video ads into hypertext documents, where these ads provide enhanced user interactivity features selected and configured by advertisers or other ad sponsors. The system also provides sophisticated tracking and real time reporting of viewer interactivity with the video ads and their enhanced features.

The invention may be implemented in the form of a system, method, programmed product, circuitry, or any combination of these.

BRIEF DESCRIPTION OF THE DRAWINGS

FIGS. 18-20B are code listings exemplifying various messages according to one embodiment of the invention.

DETAILED DESCRIPTION

The nature, objectives, and advantages of the invention will become more apparent to those skilled in the art after considering the following detailed description in connection with the accompanying drawings.

Hardware Components and Interconnections

Overall Structure

Introduction

Figure 1:
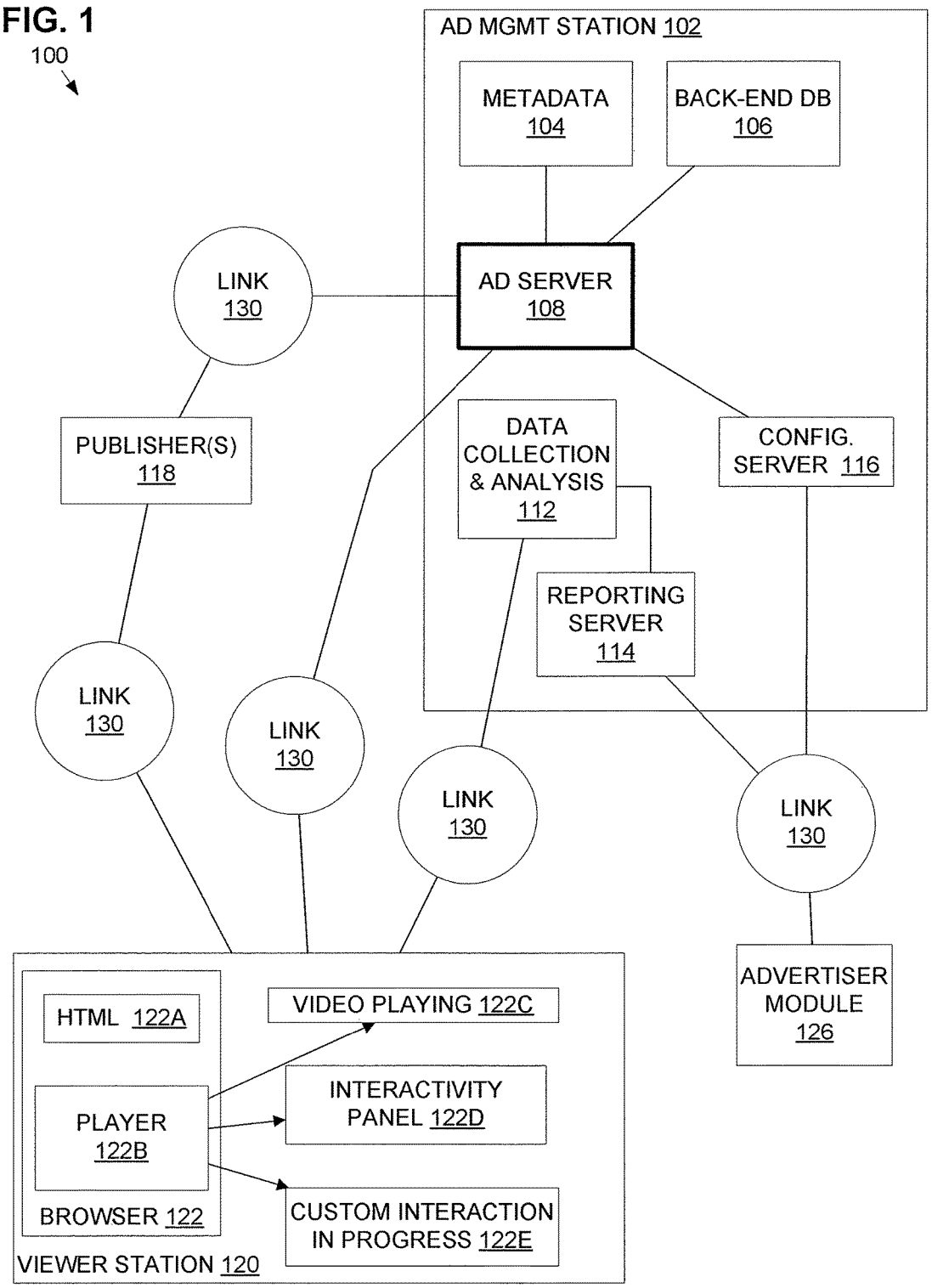
FIG. 1 is a block diagram of the components and interconnections of a ad serving system according to one embodiment of the invention.

FIG. 1 shows an advertising system 100 that delivers video advertisements (ads) with enhanced user interactivity features. The system 100 includes an ad management station 102, one or more publishers 118, one or more advertiser module 126, and multiple viewer stations such as viewer station 120. For explanatory purposes, a given video ad is discussed, although actual operation of the system may involve many video ads. The given video ad is rendered by a combination of the publisher 118 and the ad management station 102, and ultimately viewed at the viewer station 120.

Advertiser Module

As for the advertiser module 126, this may comprise any laptop, desktop, mobile computing device, workstation, slate computing device, or other equipment capable of running a hypermedia browser such as a web browser. The module 126 is connected to the ad management station 102 by a link 130. The link 130 is embodied by the public Internet in the examples herein, and accordingly the different instances of the link 130 in FIG. 1 are the same public Internet in this example. Nevertheless, separate links may be used, as may be satisfied by any wired or wireless connection or network. Some wired networks include a local area network (LAN), a wide area network (WAN), a home network, and the like. Some wireless networks include a wireless local area network (WLAN), Wi-Fi, or wireless wide area network (WWAN), mobile broadband, and the like.

At the advertiser module 126, an operator (not shown) selects and configures various enhanced interactivity features of the given video ad. The operator further uses the advertiser module 126 (or other equipment) to receive computer-generated feedback as to the performance of the given video ad among viewer stations such as 120. The operator of the advertiser module 126 may, for example, be a person affiliated with the advertising or marketing company that has sponsored or otherwise placed the given ad, a representative from a company whose products or services appear in the ad, etc. Without any intended limitation, the party that placed the given ad and subsequently manages the ad and follows its performance is referred to as an "advertiser."

Although a single module 126 is illustrated in this example, an implementation of the system 100 would include many advertiser modules 126 for the different advertiser-users.

Viewer Station

The viewer station 120 may be implemented by a laptop or desktop computer or a portable device such as a personal data assistant (PDA), mobile telephone, slate computing device, connected entertainment device, and the like. The viewer station 120 is coupled to the ad management station 102 and the publishers 118 via one or more links such as the link 130. As discussed in greater detail below, the viewer station 120 includes a hypermedia browser 122 such as a web browser, which may include an integrated or standalone media playing program. Moreover, during certain steps in the operation of the browser as discussed in greater detail below, the browser 122 includes an HTML package 122a and an ad player 122b. The player 122b is a custom component provided by the ad management station 102, and among other functions, the player 122b employs the browser 122's media playing program to play a video ad.

The components 122c-122e are not hardware or software components of the viewer station 120, but they help to illustrate the operation of the ad player 122b. Relatedly, the activity of the player 122b playing the video from the station 102 is shown by 122c, and the display of an enhanced interactivity panel is shown by 122d, and any enhanced interactivity task in progress is shown by 122e.

Although one viewer station 120 is shown in the current example, an implementation of the system 100 would include many viewer stations 120 concurrently accessing various publishers 118 and the ad management station 102.

Publisher

The publisher 118 comprises a content server or portal that provides web or other hypermedia content to viewer stations in the form of one or more hypermedia documents such as web pages or web sites. In implementation, there will be many publishers 118, but one is shown in this example for ease of illustration. Some examples of publishers include computing and serving equipment of online newspapers, online magazines, web portals, search engines, and the like.

Ad Management Station

The ad management station 102 hosts video ads and communicates with the publisher 118 and/or viewer station 120 to embed the hosted ads in content of the publisher 118. In addition, the station 102 introduces various enhanced interactivity features in conjunction with hosted video ads. The station 102 also collects data concerning the performance of hosted ads at viewer stations that consume the hosted video ads. The station 102 further analyzes and formats the collected data, and makes the results of this analysis available to advertisers, for example, via the advertiser module 126.

Metadata 104 comprises digital data storage that contains information including advertisers' instructions for delivery of video ads. A back-end database 106 comprises the same or different digital data storage, which contains the video ads themselves. The ad server 108 comprises a machine such as webserver. A configuration server 116 and reporting server 114 comprise hypermedia document servers such as web servers, and may optionally be collocated or even combined with the server 108. The data collection and analysis module 112 is a computing engine.

The individual computing components of the station 102, such as 108, 112, 114, and 116 may be implemented by a one or more hardware devices and/or software devices. In this respect, some exemplary storage and processing devices are discussed below in conjunction with FIGS. 2-4.

Exemplary Digital Data Processing Apparatus

Figure 2:
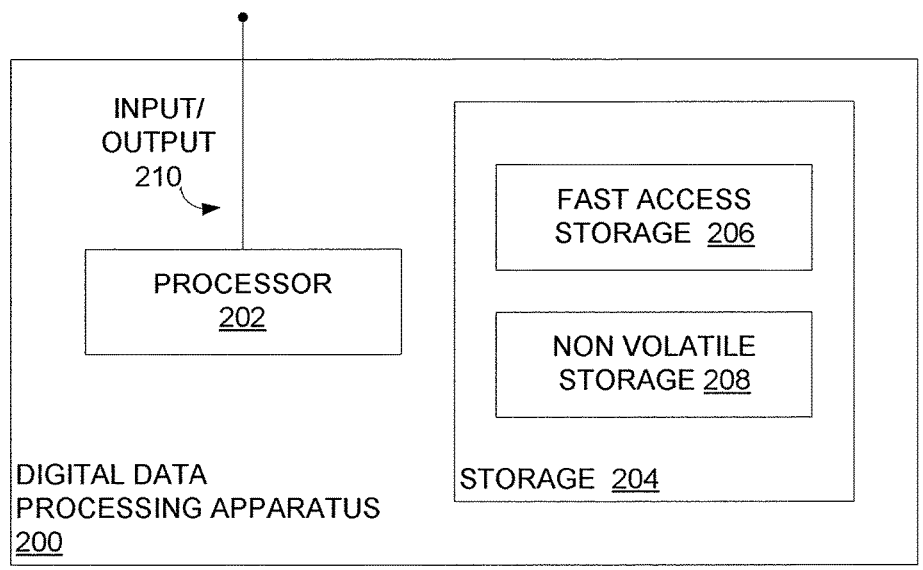
FIG. 2 is a block diagram of a digital data processing machine according to one embodiment of the invention.
Figure 3:
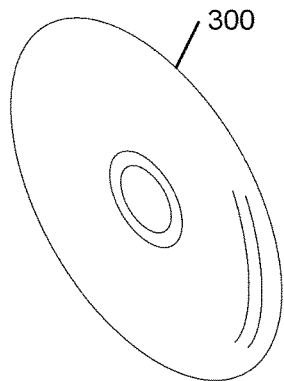
FIG. 3 shows an exemplary storage medium according to one embodiment of the invention.

As mentioned above, the data processing entities of FIG. 1 may be implemented by various processing engines. FIG. 2 shows one example, in the form of a digital data processing apparatus 200. The apparatus 200 may be implemented by a personal computer, customer circuit board, workstation, notebook computer, controller, microcontroller, state machine, or other processing machine appropriate to the requirements of the tasks explained herein. The apparatus 200 includes a processor 202, such as a microprocessor, controller, microcontroller, digital signal processor (DSP), application specific integrated circuit (ASIC), field programmable gate array (FPGA) or other programmable logic device, discrete gate or transistor logic, discrete hardware components, or any combination thereof designed to perform the functions described herein. The processor 202 may also be implemented as a combination of computing devices, such as a combination of a DSP and a microprocessor, a plurality of microprocessors, one or more microprocessors in conjunction with a DSP core, or any other such configuration.

The processor is coupled to digital data storage 204. In the present example, the storage 204 includes a fast-access storage 206, as well as nonvolatile storage 208. The fast-access storage 206 may be used, for example, to store the programming instructions executed by the processor 202. The storage 206 and 208 may be implemented by various devices, such as those discussed in greater detail in conjunction with FIGS. 3 and 4. Many alternatives are possible. For instance, one of the components 206, 208 may be eliminated; furthermore, the storage 204, 206, and/or 208 may be provided on-board the processor 202, or even provided externally to the apparatus 200.

The apparatus 200 also includes an input/output 210, such as a connector, line, bus, cable, buffer, electromagnetic link, network, modem, transducer, IR port, antenna, or other means for the processor 202 to exchange data with other hardware external to the apparatus 200.

Storage Media

As mentioned above, various instances of digital data storage may be used in the system 100, with some specifically illustrated examples including the metadata 104 and the back-end database 106. Digital data storage also embodies the storage 204 and 208, for instance. Depending upon its application, this digital data storage may be used for various functions, such as storing data, or to store machine-readable instructions. These instructions may themselves aid in carrying out various processing functions, or they may serve to install a software program upon a computer, where such software program is then executable to perform other functions related to this disclosure.

In any case, the storage media may be implemented by nearly any mechanism to digitally store machine-readable signals. One example is optical storage such as CD-ROM, WORM, DVD, digital optical tape, disk storage 300 (FIG. 3), or other optical storage. Another example is direct access storage, such as a conventional "hard drive", redundant array of inexpensive disks ("RAID"), or another direct access storage device ("DASD"). Another example is serial-access storage such as magnetic or optical tape. Still other examples of digital data storage include electronic memory such as ROM, EPROM, flash PROM, EEPROM, memory registers, battery backed-up RAM, etc.

An exemplary storage medium is coupled to a processor so the processor can read information from, and write information to, the storage medium. In the alternative, the storage medium may be integral to the processor. In another example, the processor and the storage medium may reside in an ASIC or other integrated circuit.

Logic Circuitry

Figure 4:
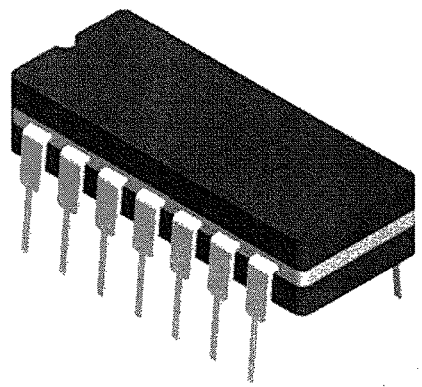
FIG. 4 is a perspective view of exemplary logic circuitry according to one embodiment of the invention.

In contrast to storage media that contain machine-executable instructions as described above, a different embodiment uses logic circuitry to implement the data processing entities of FIG. 1. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like. FIG. 4 shows an example of logic circuitry in the form of an integrated circuit 400.

Operation

Having described the structural features of the present disclosure, an operational aspect of the disclosure will now be described. The steps of any method, process, or algorithm described in connection with the embodiments disclosed herein may be embodied directly in hardware, firmware, software executed by hardware or firmware, circuitry, or a combination of these.

Overall Sequence of Operation

Introduction

Figure 5:
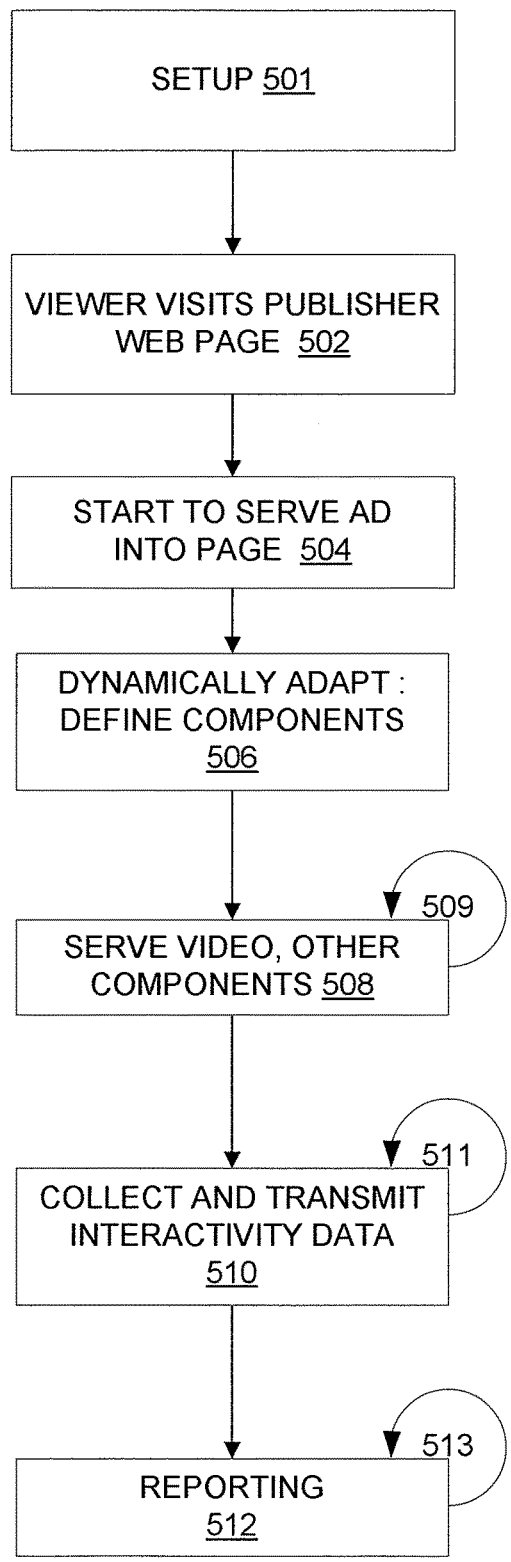
FIG. 5 is a flowchart of one exemplary sequence for delivering video ads with greater user engagement according to one embodiment of the invention.

FIG. 5 shows an operational sequence 500 illustrating various operational aspects of the system 100, including delivering video ads with enhanced interactivity as well as quantifying and reporting user engagement achieved by the consumption of such video ads. In parallel with FIG. 5, this discussion refers to FIG. 6, which shows a message-based depiction of the events in the sequence 500.

Prior to the operations 500, the publisher 118 establishes and makes available various hypermedia content such as web sites and/or web pages.

Setup

In step 501, various advertiser-users submit video ads to the station 102, for example, by using respective instances of the module 126 and link 130. The station 102 stores the video ads in the back-end database 106.

Also in step 501, the advertiser-users select and configure enhanced interactivity options for their video ads. In this regard, the configuration server 116 provides a configuration interface for each advertiser, upon authentication, to set up the enhanced interactivity options. The configuration interface provides a mechanism for an advertiser-user to initially select and configure various predetermined interactivity features, and also to change the selection and configuration of such features "on-the-fly," even after the video ad is live. As explained in further detail below, these changes take effect immediately, providing a significant advantage to the system 100 in increasing user engagement. If some interactivity is not useful or sufficiently engaging, it can be replaced without having to create and start a new ad campaign.

The interactivity features comprise different mechanisms for a human viewer to share or gather further information concerning the associated video ad. These are performed upon execution of the interactivity feature by the human viewer, with some examples including:

directing viewers to one or more predetermined websites;

providing viewers with a predetermined coupon related to products or services of the associated video ad;

providing a hyperlink for viewers to use in embedding the video ad video in other web content;

providing a video tour of a predetermined product related to the associated video ad;

providing further information about products or services of the video ad via instant message or SMS or email;

arranging for a telephone call to the viewer from an advertiser or representative affiliated with the products or services in the video ad;

emailing the video ad or a link to the video ad to a viewer identified recipient; and sharing the video ad with viewer-identified recipients via social media.

Figure 8:
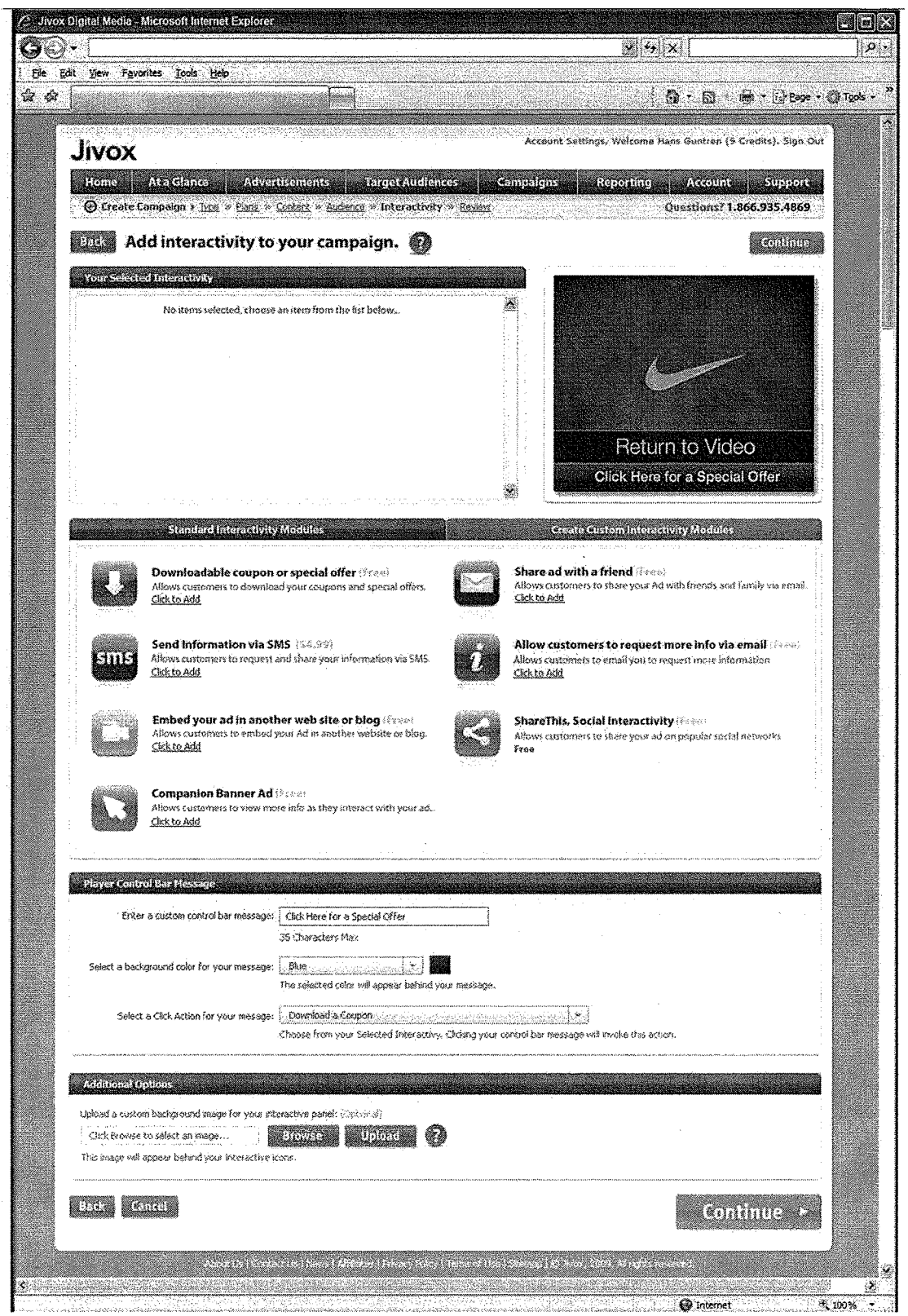
FIGS. 8-13 are screenshots showing various states of an interface for establishing and modifying interactivity features according to one embodiment of the invention.
Figure 9:
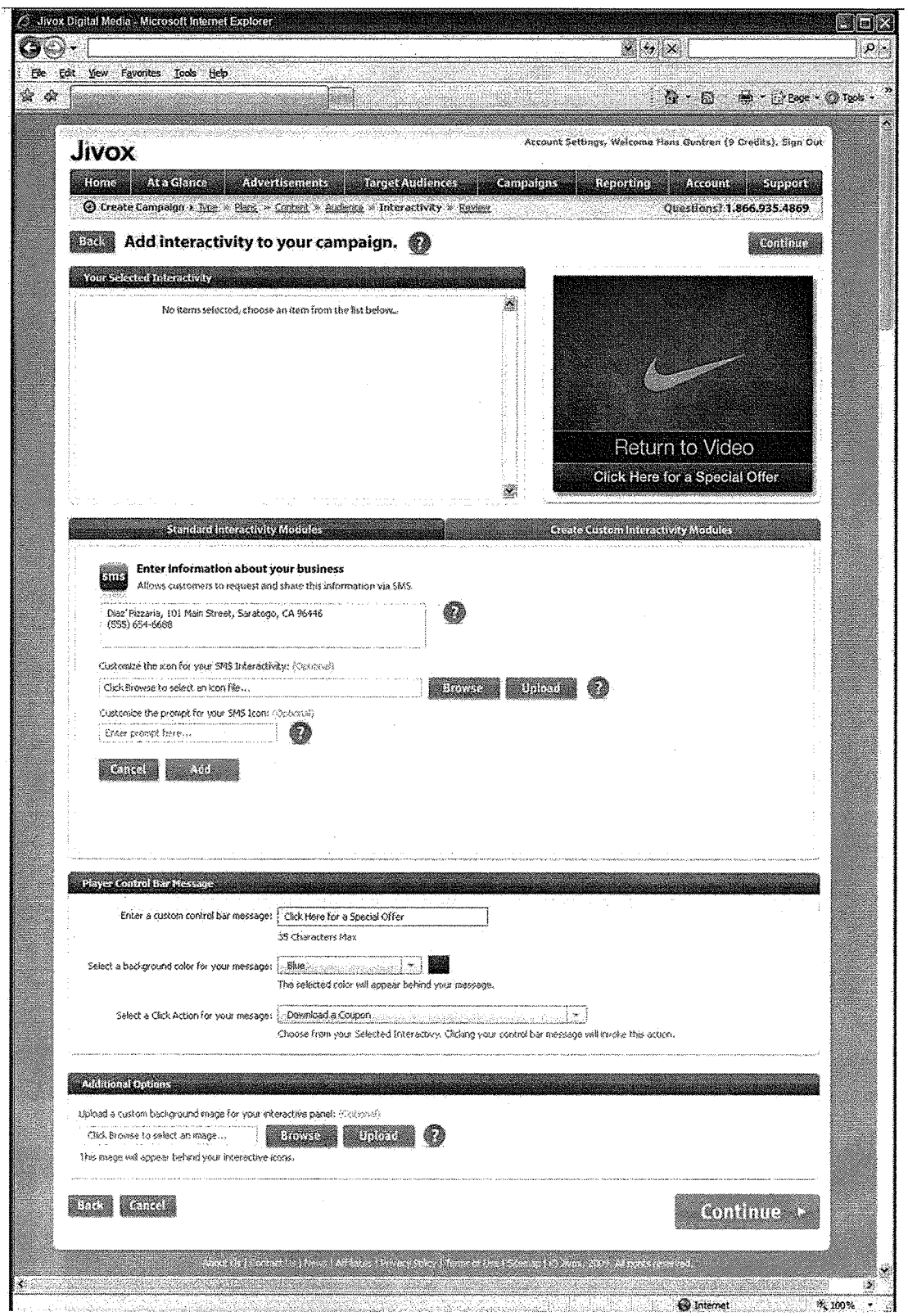
Figure 10:
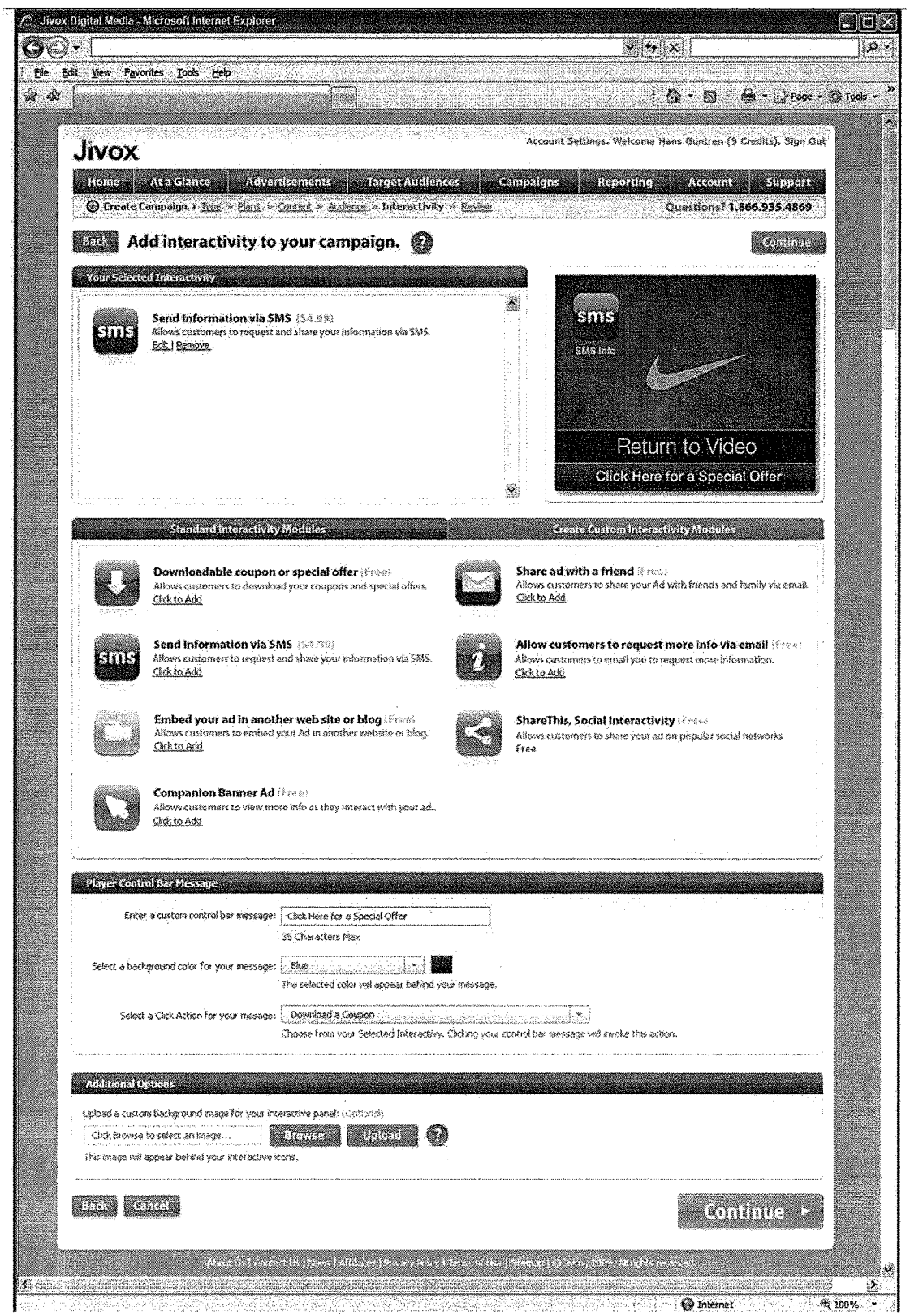

The configuration interface provided by the configuration server 116 is remotely accessible, and in this regard, may be implemented by a hypermedia document such as a web page. FIGS. 8-11 depict examples of the configuration interface in various states. In FIG. 8, the interface permits the advertiser-user to select among a fixed palette of various interactivity options for their video ad, including providing a downloadable coupon or special offer, sending information via SMS, embedding the video ad in another web site or blog, providing a companion banner ad, sharing with a friend, allowing customers to request more information via email, and sharing via various social networking websites. FIG. 9 shows the configuration interface in the process of receiving an advertiser-user's selection of an SMS option. FIG. 10 shows the configuration interface with the SMS option fully entered.

Figure 11:
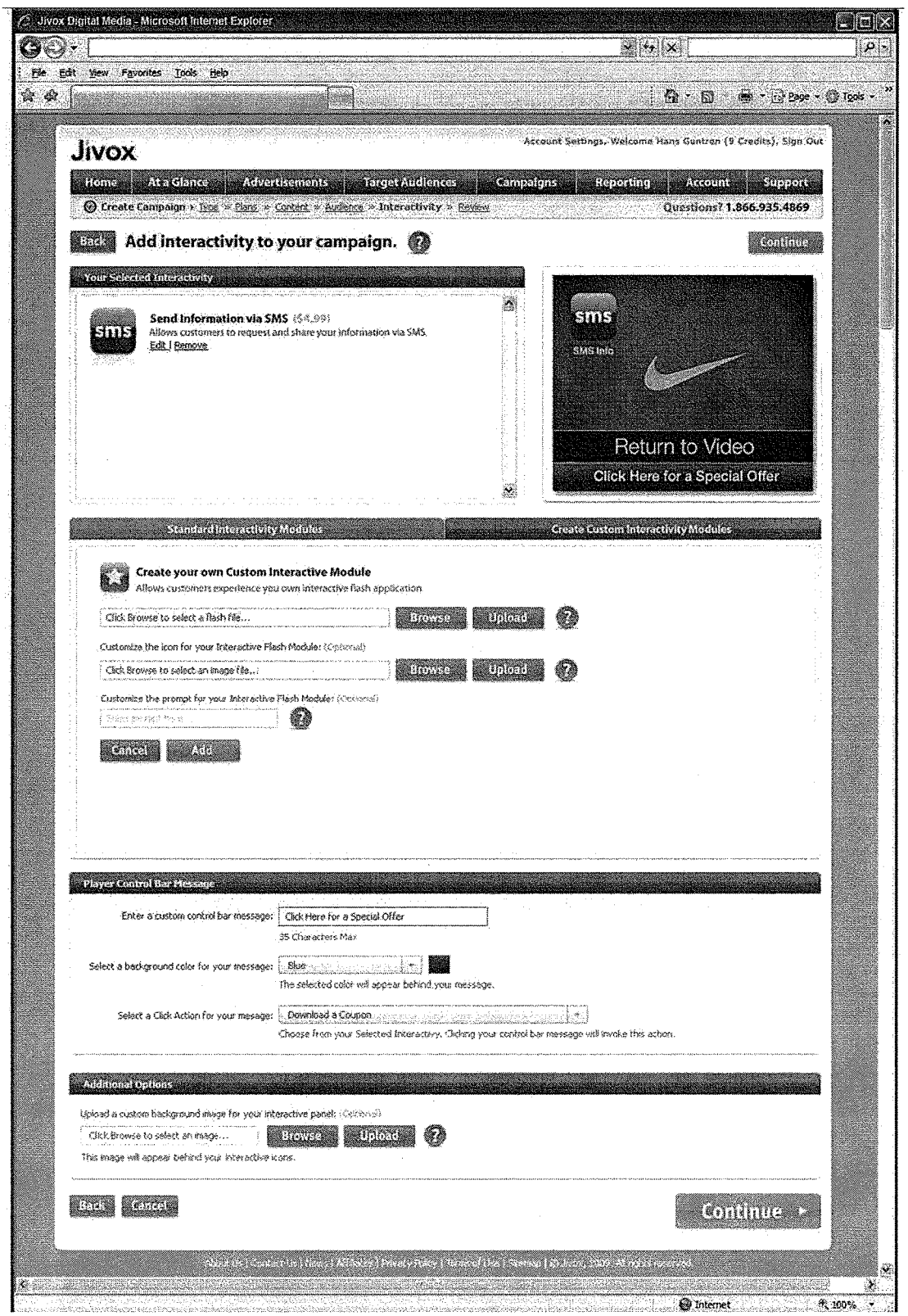
Figure 12:
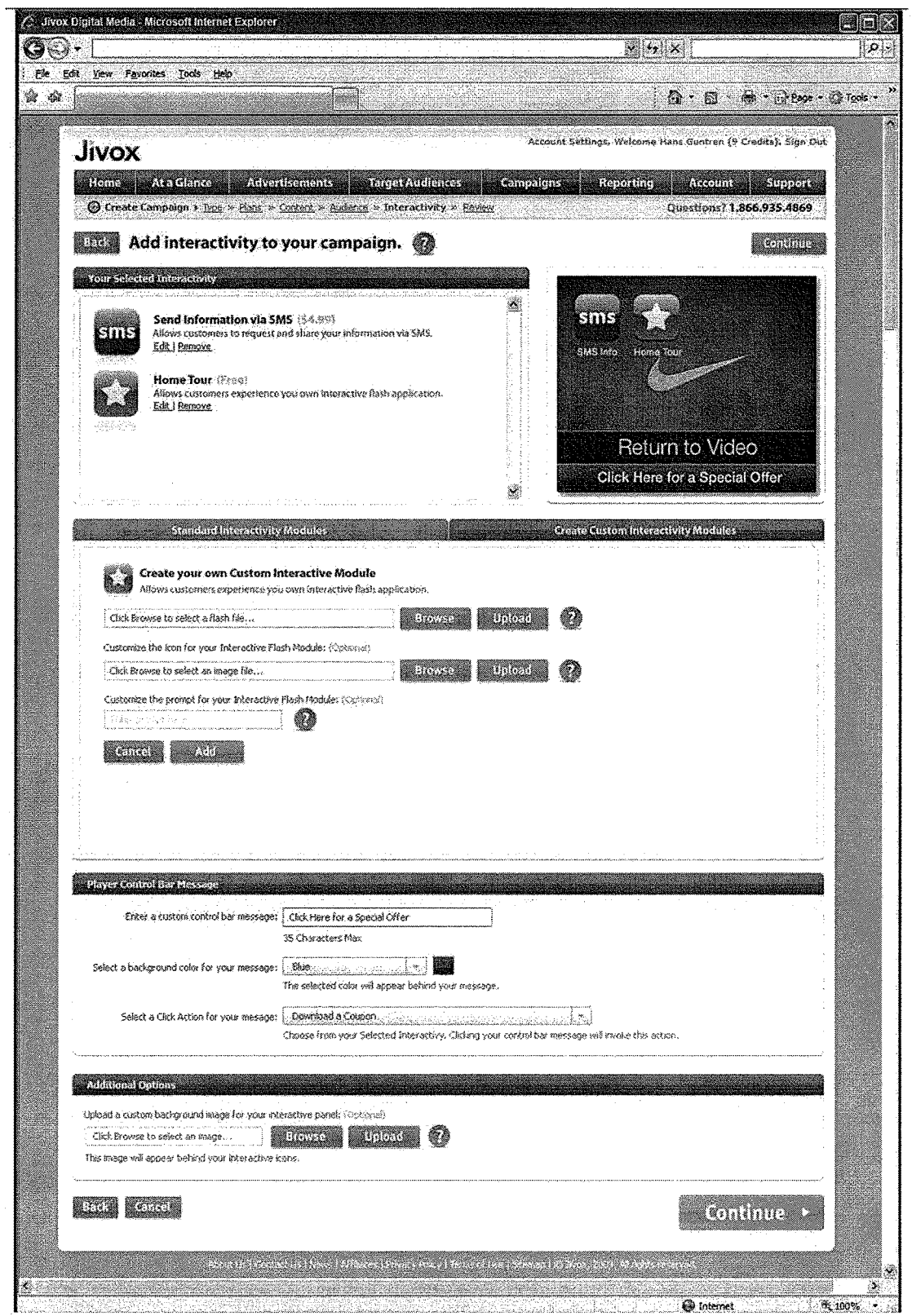
Figure 13:
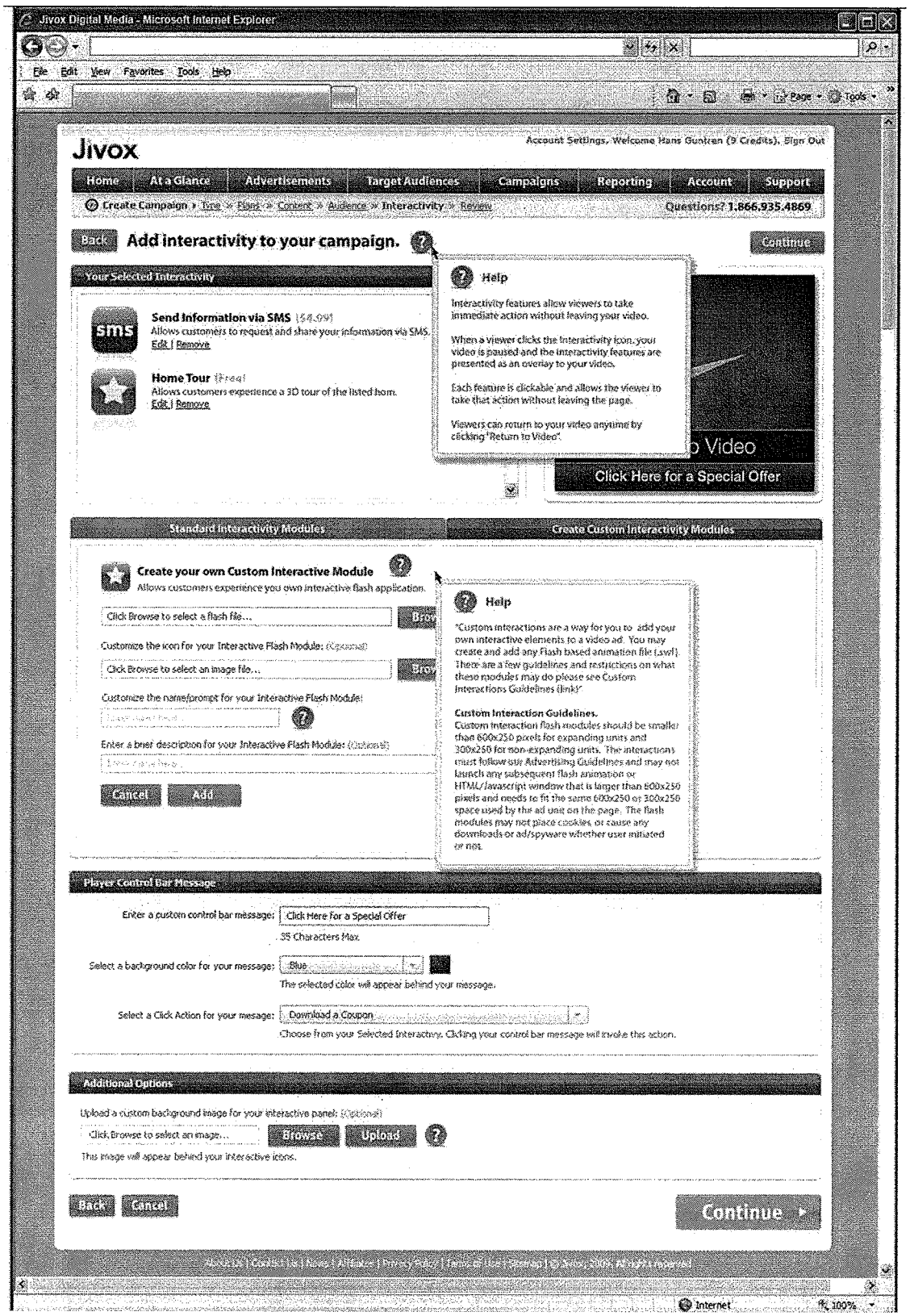

In addition to the fixed palette of interactivity modules described above, the configuration interface can receive input from the advertiser-user to create a customized interactivity feature by supplying any of text, images, video, Java Applet, JavaScript, HTML-5, or Flash file, for example. These are stored in the back-end database 106. FIG. 11 shows the configuration interface where the advertiser-user has started to create a custom interactivity module. In this example, the advertiser-user uploaded a video entitled "Home Tour", and FIG. 12 shows the configuration module with entry of the customized option complete. FIG. 13 displays the configuration interface with various help snippets.

After the advertiser-user finishes selecting and configuring the interactivity options, the station 102 sends data to the publisher 118 so that the video and enhanced interactivity functions can be published via the publisher's website. In one example, the station 102 transmits a package of HTML or JavaScript code to the publisher 118. The publisher 118 then incorporates the code into the publisher's website, whereupon the video ad (still stored in 106) goes live. The publishers where the video is embedded may be determined in advance and offline by the advertiser-user and an account manager, or determined automatically by the ad server 108.

Responsive to Viewer Request, Start to Serve Ad

Next, with the subject video ad being "live" via the publisher, a viewer operates his/her browser 122 to visit the publisher web page linked to the video ad in step 502. Accordingly, the related package of HTML or Javascript code from this web page is loaded into the browser as shown by 122a.

In step 504, when the viewer's web browser executes the package 122a pertaining the subject video ad, the browser contacts the station 102 (message 614) and the station 102 starts to serve the video ad. For example, the station 102 provides an HTML snippet wrapped around code (message 616) to deliver a customized video ad player 122b to the viewer's browser 122. Without any intended limitation, some examples of the player 122b include a Flash or HTML-5 component. In one example, the HTML snippet may include or be accompanied by various parameters from the metadata 104 prescribing various aspects for startup of the video player.

Adapt Player

In step 506, a process of dynamically adapting the downloaded player 122b to the applicable interactivity options begins. Namely, the browser 122 loads the player 122b, whereupon the player 122b begins to collect various metadata 104 that specifies information pertaining to the video, and whether there are interactive elements or not. The exchange of this metadata is shown by messages 618, 620. This metadata specifies information such as an ad identifier, the URL to the stored video itself, the URL to a thumbnail image, and whether the ad has interactivity enabled or not. FIG. 18 shows an example of this metadata.

Advantageously, the dynamic adaptation of the player 122b permits the advertiser-user to change the selection and configuration of the interactive features "on-the-fly" for future deliveries of the ad, even an earlier embodiment of the video ad has gone live. That is, by supplying the metadata 104 each time a viewer requests to load the related ad, the ad server 108 effectively renders the interactivity features anew. Any changes to the metadata 104 take effect without delay, so the station 120 can implement the most current interactivity features in real time. This helps to increase user engagement, since an interactivity feature that is not useful or sufficiently engaging can be replaced by changing the metadata 104, without having to create or start a new a new ad campaign.

Also in step 506, the downloaded player 122b further communicates with the ad server 108 to obtain the subject video ad from the back-end database 106. This is shown by messages 622, 624.

Serve Video

Next, in step 508 the player begins to play the video ad (as shown by 122c) and present the applicable interactivity features (as shown by 122d) for user execution. As shown by 509, the operation 508 may continue, for example, until the viewer leaves the current web page or selects a "close" option presented with the video.

Figure 6:
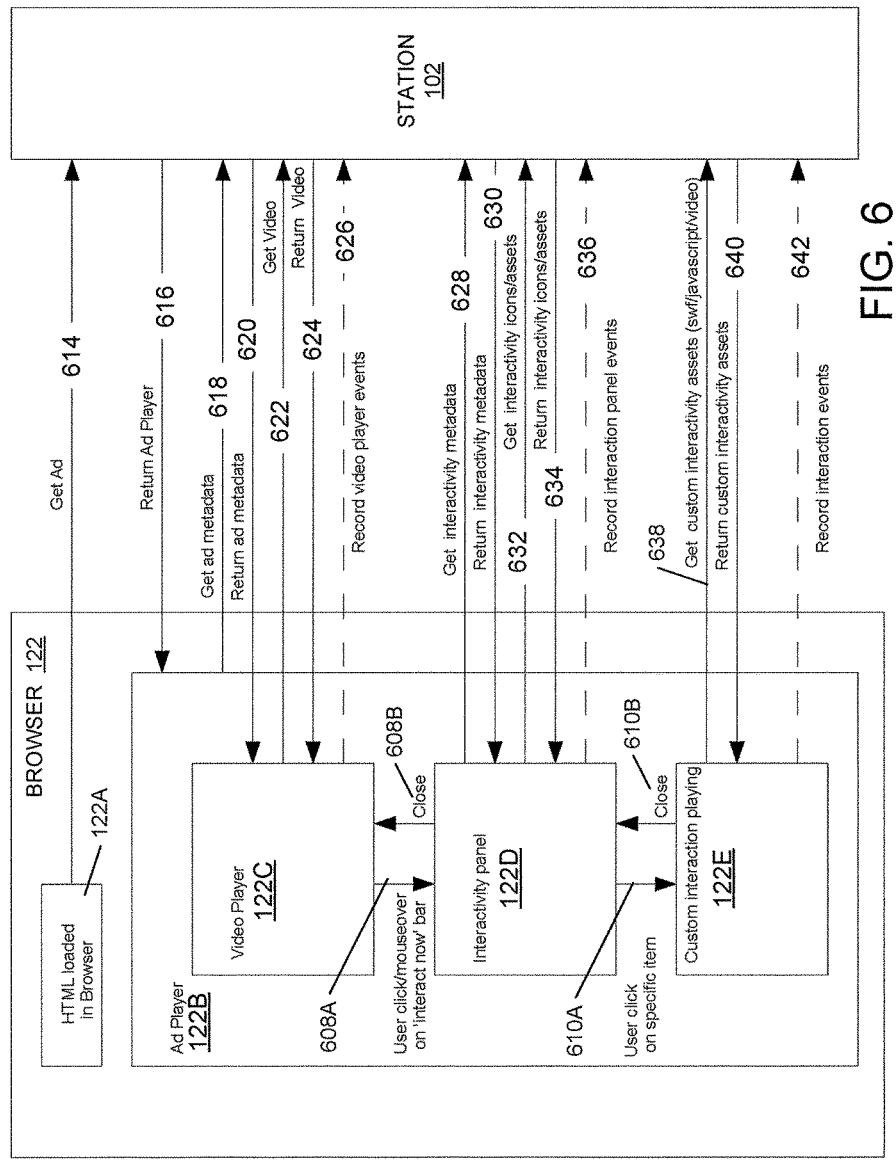
FIG. 6 is a diagram showing exemplary messages exchanged according to one embodiment of the invention.
Figure 7A:
FIGS. 7A-7E are screenshots showing exemplary video ads and related interactivity features according to one embodiment of the invention.
Figure 7B:
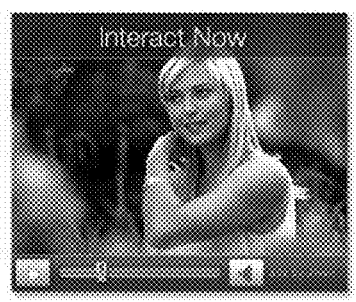
Figure 7E:
Figure 7C:
Figure 7D:
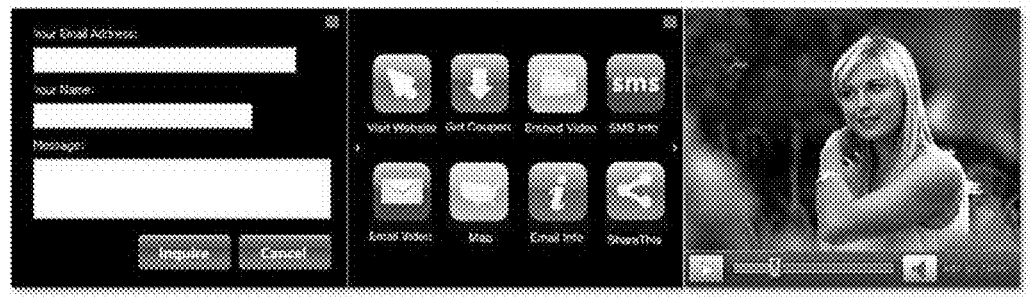

FIG. 7A shows an example of a video being played by the custom player 122b, representing 122c. In one example, the player is configured to automatically and temporarily display a semi-transparent banner, as shown in FIG. 7B. In this example, only in response to selection of the banner or a mouseover event, as represented by message 608a of FIG. 6, the player pauses the video and displays an interactivity panel with icons corresponding to the various interactivity features activated by the advertiser-user via the configuration interface discussed above. FIG. 7C shows an example interactivity panel (representing 122d), superimposed over the video ad (representing 122c). In a different example, the interactivity panel may be a slide-out or pop-out feature. FIG. 7D shows a related example where the interactivity panel is broken-out aside the video ad. FIG. 7E shows a different example where the interactivity panel is automatically superimposed over the video when the video finishes playing. In FIG. 6, messages in connection with viewer activation and closing of the interactivity panel 122d are shown at 608a, 608b. The interactivity panel 122d closes as represented by message 608b in response to user input.

Still referring to step 508, when the viewer activates the interactivity panel 122d generally, the ad player 122b requests interactivity metadata from the station 102 and metadata storage 104, as shown by message 628. The station 102 returns the interactivity metadata, per message 630. This metadata 630 contains information about each of the interactive elements of the video 122c, and in particular, data for each interactivity element specifying aspects such as the icon and text to display, the display order, and whether the interactivity is a click thru, a video, JavaScript code or a Flash module. The metadata 630 also specifies additional metadata that the advertiser-user may enter that is interpreted by the specific interactivity. For example, if the interactivity is to take the viewer to a web site, then the metadata will specify the URL of the site the user will be taken to. No limit is necessarily imposed on the amount of metadata that may be returned to the player by a single interactivity option. FIG. 19 shows an example of metadata that contains information about interactive elements of a video ad that uses interactivity elements from a fixed palette. FIGS. 20A-20B show metadata for a video ad with custom interactivity elements.

After obtaining the metadata, the player 122b communicates with the station 102 to obtain the applicable interactivity icons for use in the interactivity panel, and further interactivity assets such as the following: video files if any of the interactivity elements play a secondary video, a Flash module, and any images that may be loaded by a JavaScript custom interactivity module. The request and return of interactivity icons and asset is illustrated by the messages 632, 634. Whenever the viewer invokes the interactivity panel, the ad player 122b records the viewer's interaction with the panel and transmits representative messages to the module 122, as shown by message 636.

As another part of step 508, the player 122b executes any enhanced interactivity functions responsive to the viewer selecting them from the interactivity panel 122d. This corresponds to message 610a. To activate the requested interactivity function, the ad player 122b obtains custom interactivity assets from the station 102, per messages 638, 640. These assets include any text, images, graphics, or other items specified during advertiser customization as discussed above in step 501. Item 122e represents any enhanced interactivity functions being executed. The message 610b occurs when the enhanced interactivity feature finishes on its their own, or the viewer terminates it.

Collect and Transmit Interactivity Data

In step 510, the player 122b transmits and the module 112 collects statistics concerning viewer consumption and interactivity with the subject video ad and its interactivity features. Step 510 occurs repeatedly, as shown by 511. In one example, the module 112 collects statistics in real time, since the statistics are transmitted by the player as the related events occur.

The following is some more detailed explanation of exemplary events in step 510. As soon as the video is served to the viewer's browser 122, the custom player 122b begins to collect various user statistics and report them back to the data collection and analysis module 112, as shown by message 626. When the interactivity panel is invoked, the ad player 122b records further statistics and transmits them to the module 122, as shown by message 636. When the viewer executes an enhanced interactivity function, the ad server 122b records and reports further statistics to the module 122, as shown by the message 642.

Some examples of reported statistics include:
- The fact that the viewer requested the page containing the video ad.
- The number of times that the viewer played the video ad.
- The number of redirection of viewers to one or more predetermined websites.
- Viewer requests to obtain a predetermined coupon related to products or services of the associated video ad.
- Viewer requests for a hyperlink to use in embedding the video ad video in other web content.
- Viewer activation of a video tour of a predetermined product related to the associated video ad.
- Viewer requests for further information about products or services of the video ad via instant message or short message or email.
- Viewer request to email the video ad or a link to the video ad to a viewer identified recipient.
- Viewer requests to share the video ad with viewer-identified recipients via social media.

Reporting

In step 512, the module 112 prepares one or more reports representing the interactivity data, and the reporting server 114 makes these available to authenticated user-advertisers. As shown by 513, the module 112 repeatedly updates the report according to the latest acts of collecting the interactivity data, and the server 114 posts updated data. The report may be updated and/or made available to advertisers continually or upon any desired periodic or event-driven schedule.

The reporting server 114 provides a reporting interface mechanism for advertiser-users to view the reports mentioned above. The reporting interface provided by the configuration server 116 is remotely accessible, and in this regard, may be implemented by a hypermedia document such as a web page. Some exemplary outputs provided by the reporting are shown below.

In one example of step 512, the module 112 computes an engagement score based on a prescribed formulation of the interactivity data collected for the given ad. Thus, in the present example, the reporting server 114 provides one or more web pages depicting the engagement score and other analyzed data using text and/or graphics. The computation of engagement score is described in greater detail below in conjunction with FIG. 21.

Figure 14:
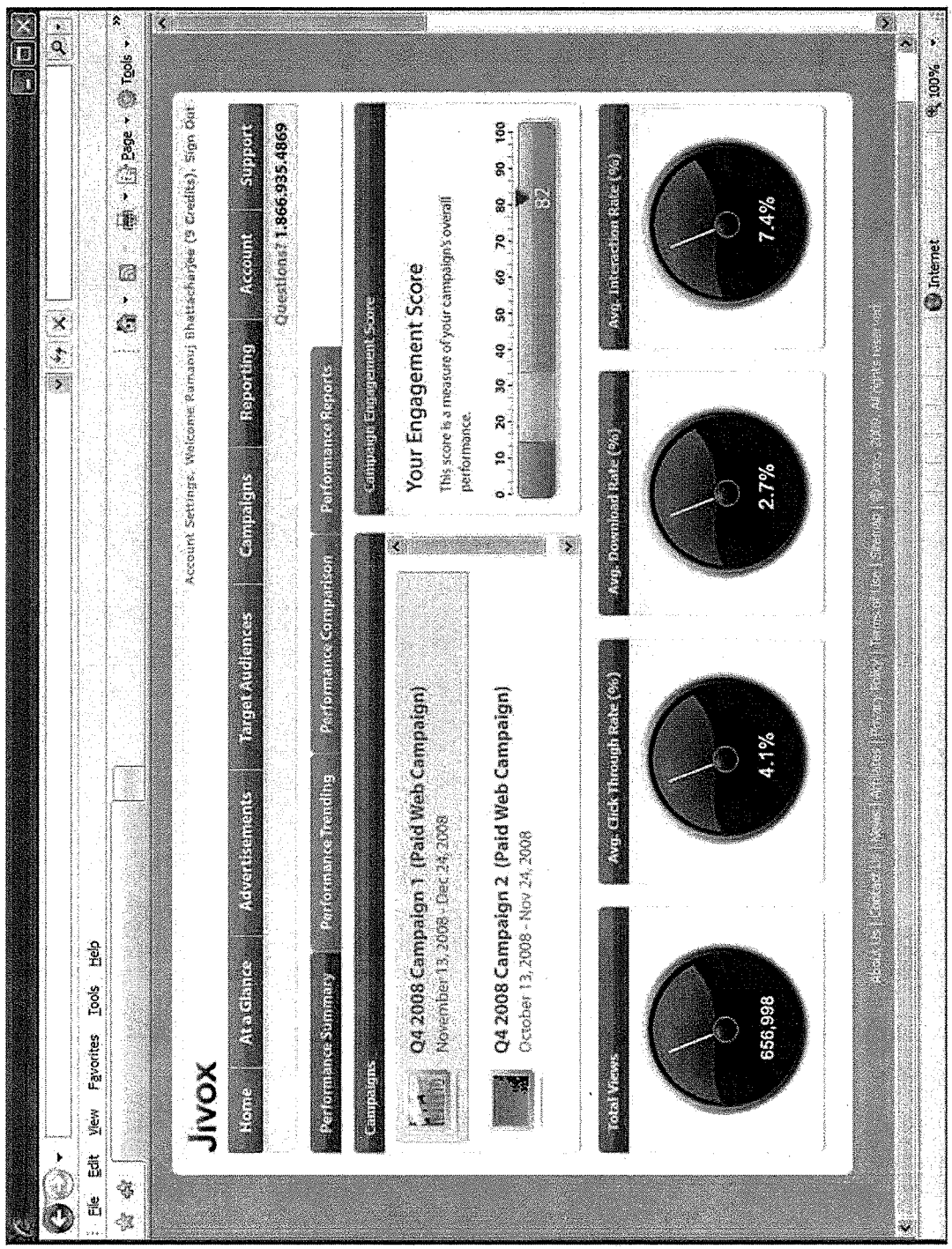
FIGS. 14-17 are screenshots showing an interface reporting various user engagement statistics for a video ad according to one embodiment of the invention.
Figure 15:
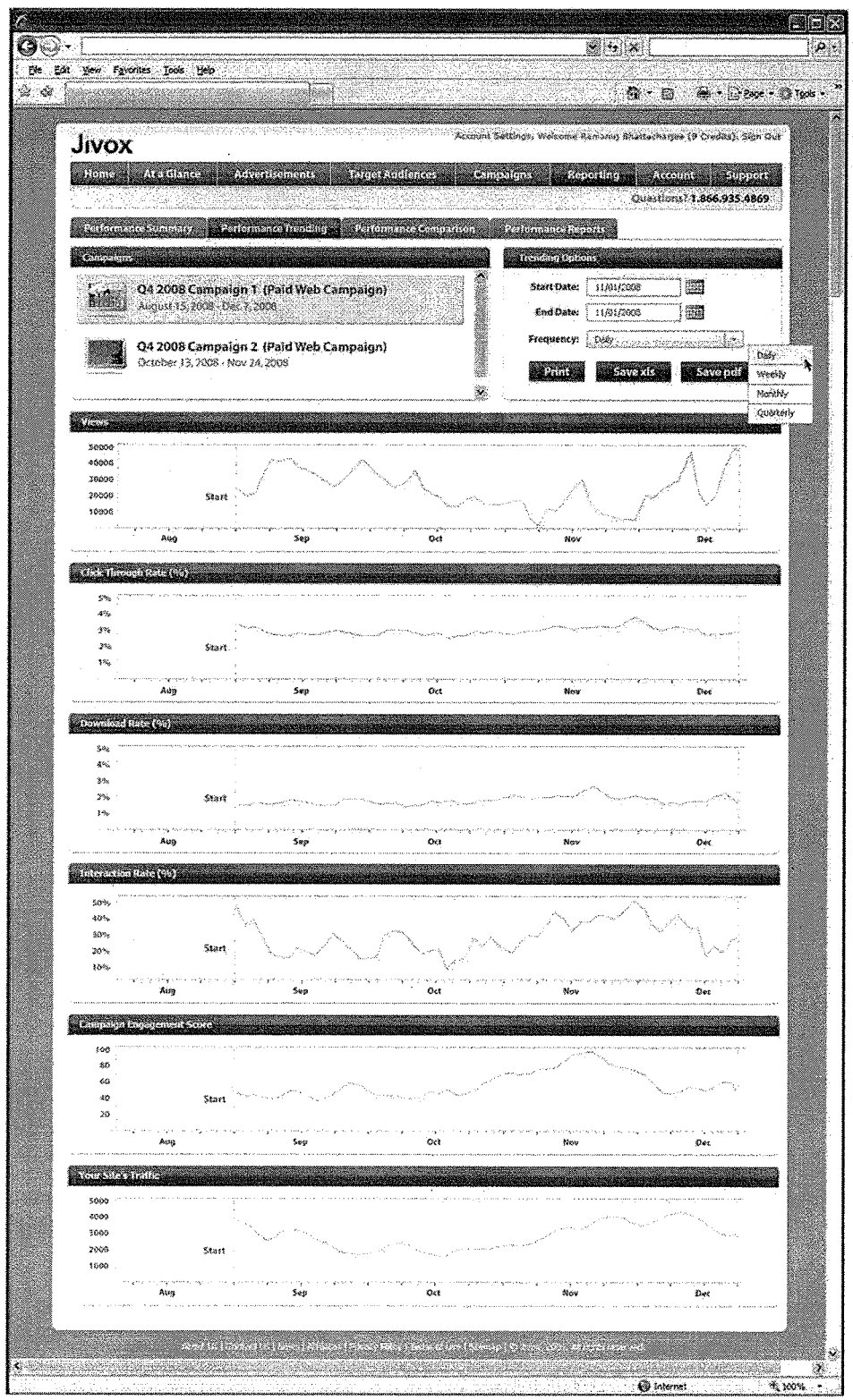
Figure 16:
Figure 17:
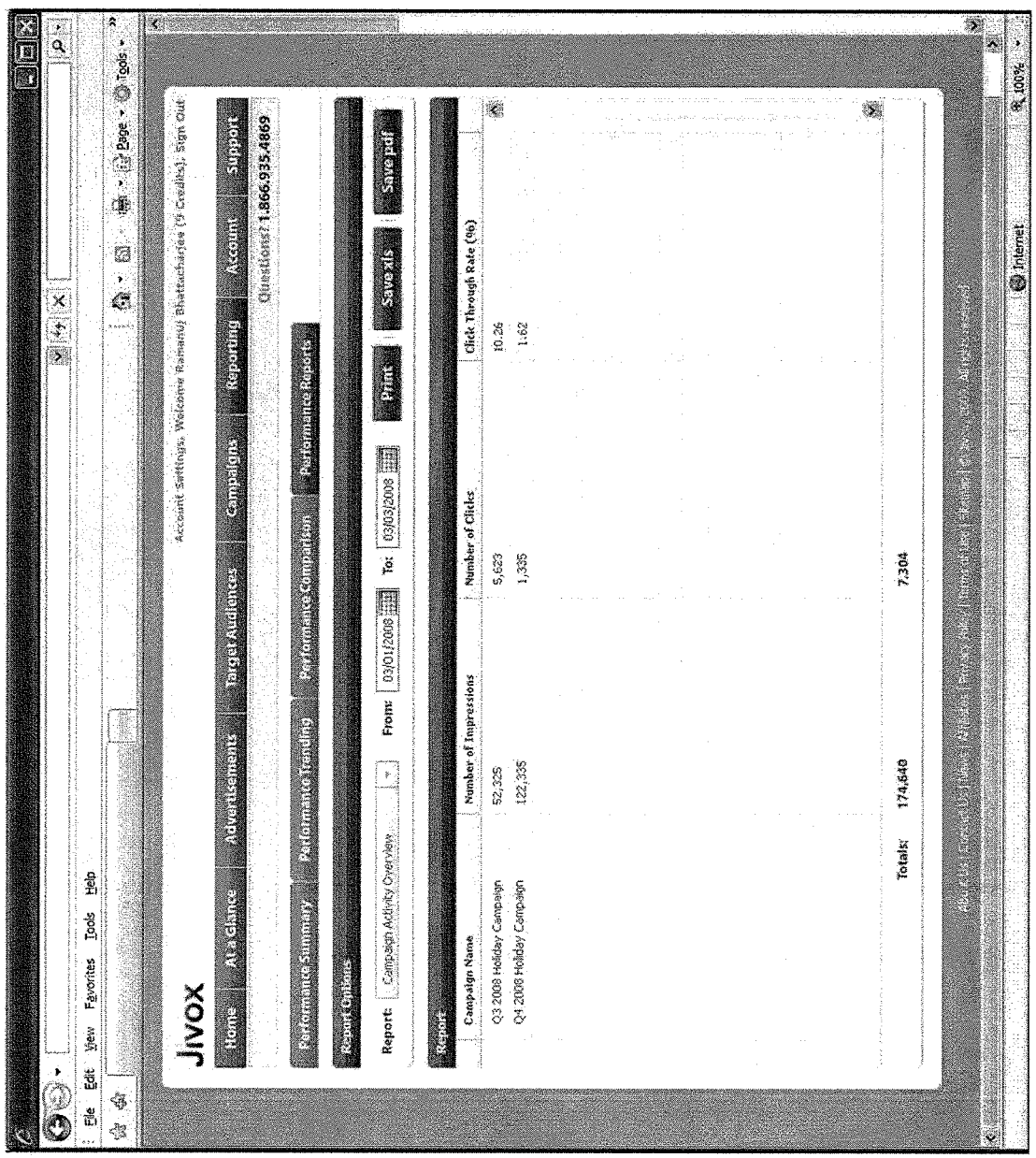

FIGS. 14-18 show various reporting web pages that the reporting server 144 makes available to the authenticated advertisers. FIG. 14 shows a webpage with graphical representations of various current statistics including total views, click through rate, download rate, interaction rate, and the engagement score. In one example, color coding may be used to indicate whether the engagement score and therefore the performance of the ad campaign is good, fair, or poor. FIG. 15 shows a webpage with graphical representations of various statistics over time, including total views, click through rate, download rate, interaction rate, engagement score, and site traffic. FIG. 16 shows a web page comparing various aspects of two different advertising campaigns. FIG. 17 shows a web page with a table of statistical data comparing two advertising campaigns.

The processes 508 and 510 end whenever the viewer unloads the video ad from the browser 122, for example by leaving the related web page or closing the browser 122.

The process 512 continues indefinitely, and does not end until the campaign for the subject video ad is completed or canceled and the subject video ad taken offline at the station 102. The updating 513 of statistics related to the subject ad, however, may conclude when the video ad is unloaded from the browser 122.

For ease of description, the previous example was given in the context of an exemplary browser 122. As will be apparent to ordinarily skilled artisans having the benefit of this disclosure, the foregoing steps, messages, and other details may be modified as needed in the case of a mobile cellular telephone or slate computing device in order to place components such as the ad player 122b and/or video player 122c inside an application running on the telephone or device.

Engagement Score

As discussed above, one feature of the reporting operation 512 may include computation of an engagement score. The engagement score is computed based on some or all of the interactivity statistics reported to the module 112 by the viewers' browsers. Optionally, module 112 may scale the engagement score according to the totality, or a selected group, of unrelated video ads hosted by the advertising server.

In a specific example, the engagement score is computed by computing a total number of viewer interactions, where each interaction is weighted by a predetermined scaling factor according to type of interaction. Then, the computed total is divided by the total views of the video ad. This quotient is normalized to fit in a predetermined range, such as from zero to one hundred. This number may be further adjusted to that the median of engagement scores across all video ads hosted by the station 102, or all videos with more than a given minimum number of views, has a score of fifty, for example.

The following provides a more specific example, where an exemplary interactivity panel includes options for the viewer to receive information by email, email a referral to another party, and embed the video in other content. In this example, the engagement score is computed according to the following equation: Preliminary engagement score=83000×(clicks×30+Downloads×30+Email requests 30+SMS request×5+Email Friend Requests×5+Embed×10)/110*Views. The preliminary score is then adjusted using a Bayesian estimator. The Bayes estimate normalizes the preliminary score to take into account the effect of a larger number of views.

Figure 21:
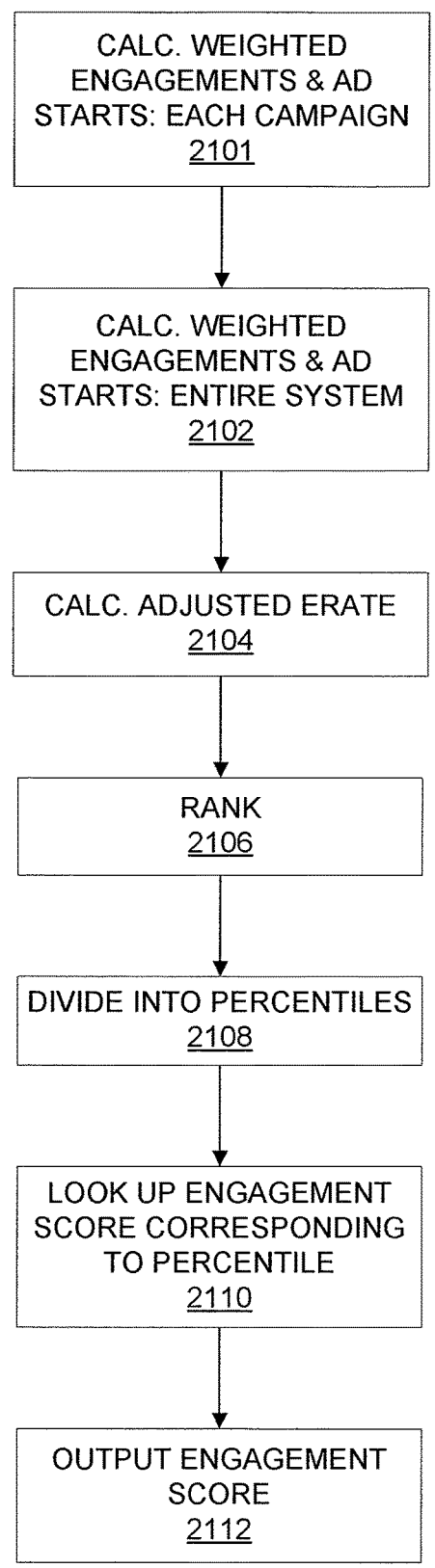
FIG. 21 is a flowchart of an exemplary sequence for calculating and displaying engagement score according to one embodiment of the invention.

FIG. 21 shows an operational sequence 2100 that explains the computation of engagement score in greater detail. Step 2101 calculates a weighted number of engagements and adStarts for each campaign. The weighted engagements divided by adStarts provide an "eRate." Step 2102 calculates the weighted engagements and adStarts for all ad campaigns hosted by the station 102.

Step 2104 adjusts an adjusted eRate, called an "engagement score value" using the formulas: engagementScoreValue=100*((engagements/adStarts)*(adStarts)/(adStarts+1000)+(totalEngagements/totalAdStarts)*1000/(adStarts+1000)) for adStarts>0, and engagementScoreValue=0 adStarts<=0.

This adjustment is based on calculating the Bayesian estimate of a binomial distribution of an interaction occurring or not occurring. The number 1000 is a number chosen for this example, without limitation, to represent the minimum sample size. In this case it means that a lesser weight is given to campaigns with less than 1000 ad starts.

Step 2106 ranks the campaigns by engagement score value, then step 2108 divides the ranks into percentiles so that all the ranks are evenly distributed over the range 1-100. Next, for every percentile, step 2110 looks up the engagement score corresponding to the percentile. Table 1 shows an example.

TABLE 1

| ENGAGEMENT SCORE VALUE | RANK |
|---|---|
| 0 | 0 |
| 7.2522487435982e-005 | 1 |
| 7.282079890779944e-005 | 2 |
| 0.00621229849068128 | 3 |
| 0.0148606154182538 | 42 |
| 0.0149472960249837 | 43 |
| 0.0150940686600569 | 44 |
| 150.019026025838 | 4469 |
| 205.748932943262 | 4470 |
| 2228.62592253361 | 4471 |

In this example, the percentiles are shown in Table 2.

TABLE 2

| PERCENTILE | PERCENTILE RANK | PERCENTILE ENGAGEMENT SCORE VALUE |
|---|---|---|
| 1 | 44.72 | 0.0150940686600569 (Corresponds to a percentile rank of 44) |
| 2 | 89.44 | 0.0183016674680752 (corresponds to a percentile rank of 89) |
| 3 | 134.16 | 0.0216031726430907 |

Thus, the engagement score for a campaign is the percentile that the campaign's engagement score value (or rank) falls in. Step 2112 provides an output of this value, which the module 112 makes available to the advertiser-user pursuant to step 512 as discussed above.

Other Embodiments

While the foregoing disclosure shows a number of illustrative embodiments, it will be apparent to those skilled in the art that various changes and modifications can be made herein without departing from the scope of the invention as defined by the appended claims. Accordingly, the disclosed embodiment are representative of the subject matter which is broadly contemplated by the invention, and the scope of the invention fully encompasses other embodiments which may become obvious to those skilled in the art, and that the scope of the invention is accordingly to be limited by nothing other than the appended claims.

The claimed invention is:

1. A method comprising:
   providing a processor that executes instructions for hosting video ads for display to a viewer;
   said processor providing a configuration interface for an ad creator to select a set of interactivity features from a plurality of available interactivity features to associate with a video ad that is selected by said ad creator from among hosted video ads;
   said processor storing metadata separate from the selected video ad said metadata comprising a record of said selected interactivity features that are associated with the selected video ad,
   said processor sending a web page that includes the video ad, over a computer network to a hypermedia browser, responsive to a request from the viewer to play the video ad, said processor sending an ad player and metadata over the computer network to the hypermedia browser;
   the ad player causing the hypermedia browser to display an icon corresponding to each interactivity feature associated with the video ad as described by the metadata;
   said processor transmitting an executable video player comprising an executable module over the computer network to the hypermedia browser in response to the viewer selecting an icon for activation,
   wherein the executable module provides a particular interactivity feature corresponding to the selected icon with the video ad;
   executing the downloaded executable module;
   said processor receiving a notification that the particular interactivity feature was selected, and
   dynamically adapting said executable video player module to change the selection and configuration of the interactive features on-the-fly by supplying metadata each time a viewer requests the related ad and, responsive thereto, the processor rendering the interactivity features anew;
   wherein any changes to the metadata take effect without significant delay; and wherein the most current interactivity features are implemented in real time.

2. The method of claim 1, wherein the plurality of available interactivity features include at least one of:
   causing a telephone connection to be formed between the viewer and a representative affiliated with products or services of the video ad;
   providing a hyperlink for the viewer to use to embed the video ad in other hypermedia content;
   providing a video tour of a predetermined product or service or facility related to the associated video ad;
   providing the viewer with further information about products or services of the video ad via instant message or text message;
   emailing the video ad or a link to the video ad to a third party recipient identified by the viewer; and
   sharing the video ad with viewer-identified recipients via social media.

3. The method of claim 1, further comprising:
   receiving from the ad creator entry of data defining a desired interactivity feature;
   wherein the desired interactivity feature is not included in the plurality of available interactivity features; and
   adding the desired interactivity feature to the plurality of available interactivity features;
   wherein the entered data comprises an icon that represents the desired interactivity feature and a reference to an executable module; and
   wherein the executable module comprises one of a Java Applet, JavaScript, or hypertext code.

4. The method of claim 1, wherein:
   the notification that the particular interactivity feature was selected includes interactivity data; and
   providing a display interface to display one or more reports representing the interactivity data, and repeatedly updating the one or more reports to reflect the most recently received interactivity data.

5. The method of claim 1, further comprising:
   automatically or in response to cursor position relative to display of the given video ad, the ad player displaying a semi-transparent bar over the given video ad, where the operation of displaying different icons representing different ones of the selected set of interactivity features is performed only in response to cursor proximity to the bar or viewer selection of the bar.

6. The method of claim 1, wherein displaying icons corresponding to the set of interactivity features employs one of the following options pre-selected by the ad creator via the configuration interface:
  superimposing the icons over the video ad; or
  displaying the icons in a pop-out or slide-out external to the video ad.

7. The method of claim 1, further comprising:
  after the video ad has been downloaded into a particular viewer's hypermedia browser and viewed by the particular viewer, a second ad creator using the configuration interface to change the set of interactivity features associated with the video ad and storing second metadata that describes the changed set of interactivity features;
  subsequent to the ad creator changing the set of interactivity features associated with the video ad that was previously downloaded into the particular viewer's hypermedia browser, the particular viewer requesting to view the video ad again;
  responsive to the viewer requesting to refresh the web page and view the video ad again, the hypermedia browser downloading the second metadata; and
  the ad player displaying icons for the changed set of interactivity features.

8. The method of claim 1, wherein the plurality of availability interactivity features includes at least one of:
  presenting a poll for soliciting viewer input;
  inviting a viewer to play a game; or
  offering the viewer a coupon for a product.

9. A computer system comprising:
  a server hosting video ads for display to a viewer comprising a configuration interface for an ad creator to select a set of interactivity features from a plurality of available interactivity features to associate with a video ad that is selected by said ad creator from among said hosted video ads and to change the selection and configuration of said interactivity features on-the-fly, including after the video ad is live, without having to create and start a new ad campaign;
  wherein the plurality of availability interactivity features includes at least one of:
  presenting a poll for soliciting viewer input;
  inviting the viewer to play a game, or offering the viewer a coupon for a product;
  an ad creation metadata store storing metadata separate from the selected video ad, said metadata comprising a record of said selected interactivity features that are associated with said selected video ad;
  said server sending a Web page that includes the video ad to a client computing device for display on said client computing device by a hypermedia browser, wherein the hypermedia browser:
  downloads downloading an ad player;
  executes executing the ad player to play the video ad;
  receives said metadata describing the selected set of interactivity features;
  displays one or more icons representing each of the selected set of interactivity features associated with the video ad;
  receives input requesting activation of to activate an icon;
  receives an executable video player comprising an executable video player module over the computer network, wherein the executable video player module is associated with the activated icon for providing a particular interactivity feature; and sends notification that the particular interactivity feature was selected; and
  dynamically adapting said executable video player module to change the selection and configuration of the interactive features on-the-fly by supplying metadata each time a viewer requests the related ad and, responsive thereto, the processor rendering the interactivity features anew;
  wherein any changes to the metadata take effect without significant delay; and wherein the most current interactivity features are implemented in real time.

10. The system of claim 9, wherein the hypermedia browser is further configured to perform:
  receiving input to reload the web page;
  downloading second metadata, wherein the second metadata is different from the metadata associated with the video ad that was previously downloaded into the hypermedia browser; and
  the ad player displaying icons corresponding to a changed set of interactivity features.

11. The method of claim 1, further comprising:
  said processor storing an impression count representing a number of times each hosted video ad has been played;
  responsive to receiving a notification that a particular video ad of a plurality of video ads has been played, said processor incrementing the impression count of the particular video ad that has been played;
  said processor storing an interaction count corresponding to a number of times an interactivity feature associated with a video has been selected, wherein said interactivity features are implemented with the executable video player comprising an executable module sent to a hypermedia browser in response to a viewer selecting an icon for activation, wherein the executable video player module provides a particular interactivity feature corresponding to the selected icon with the video ad;
  responsive to receiving a notification that a particular interactivity feature associated with the particular video ad has been selected, said processor incrementing the interaction count for the particular interactivity feature associated with the particular video ad has been selected;
  for each video ad provided by an advertising server, said processor computing an engagement score based on:
    the impression count for said each video ad; and
    the interactivity count corresponding to each type of interactivity feature associated with said each video ad;
  said processor displaying a representation of the engagement score computed for said each video ad using at least one of text and graphics; and
  said processor repeatedly updating the displayed representation to reflect interactivity data most recently collected.

12. The method of claim 11, wherein a distinct interactivity count is stored representing a number of times the following has occurred:
  requests to view a video ad;
  redirection of viewers to one or more predetermined websites;
  causing a telephone connection to be formed between a viewer and a representative affiliated with products or services of the video ad;

requests to obtain a predetermined coupon related to products or services of a video ad;

requests for a hyperlink to use in embedding a video ad in other hypermedia content;

activation of a video tour of a predetermined product or service or facility related to a video ad;

requests for further information about products or services of a video ad via instant message or short message or email;

requests to email a video ad or a link to a video ad to a viewer identified recipient; and requests to share a video ad with one or more viewer-identified recipients via social media.

13. The method of claim 12, further comprising storing a distinct interactivity count representing a number of times a particular icon representing a custom interactive feature is selected for activation;

wherein the custom interactive feature is defined by the ad creator by providing the icon that represents the custom interactivity feature and a reference to an executable module.

14. The method of claim 11, wherein computing the engagement score further includes scaling the engagement score according to all or a selected group of other video ads hosted by the advertising server.

15. The method of claim 11, wherein computing the engagement score for a particular video ad further comprises:

determining a predetermined scaling factor for each type of interactivity feature;

computing a scaled interaction score for said each type of interactivity feature, the scaled interaction score computed based on the interactivity count for said each type of interactivity feature and the predetermined scaling factor;

computing a total interaction score for the particular video ad by summing each scaled interaction score associated with the video ad;

dividing the computed total interaction score by the impression count of the particular video ad to yield a quotient; and normalizing the quotient based on the impression count to fit into a predetermined range.

16. The method of claim 15, wherein normalizing the quotient is performed using Bayesian estimation.

17. The method of claim 15, further comprising:

storing a first impression count for a first video ad;

computing a first quotient for the first video ad;

computing a first engagement score for the first video ad using the first interaction count and the first quotient;

storing a second impression count for a second video ad that is greater than the first interaction count;

computing a second quotient for the second video ad that is equal to the first quotient; and computing an engagement score for the second video ad that is greater than the first engagement score.

* * * * *